US008509251B2

United States Patent
Lin et al.

(10) Patent No.: US 8,509,251 B2
(45) Date of Patent: Aug. 13, 2013

(54) GATEWAY DEVICE CAPABLE OF ENHANCING VIDEO PACKET TRANSMISSION QUALITY AND METHOD THEREOF

(75) Inventors: Shan Lin, Taipei (TW); Derek Tai, Taipei (TW); Stephen Tseng, Taipei (TW); Terrel Yeh, Taipei (TW); Samantha Su, Taipei (TW)

(73) Assignee: D-Link Corporation, Taipei (TW)

( * ) Notice: Subject to any disclaimer, the term of this patent is extended or adjusted under 35 U.S.C. 154(b) by 190 days.

(21) Appl. No.: 13/064,005

(22) Filed: Mar. 2, 2011

(65) Prior Publication Data

US 2012/0155481 A1 Jun. 21, 2012

(30) Foreign Application Priority Data

Dec. 21, 2010 (TW) ................................ 99144995 A

(51) Int. Cl.
*H04L 12/28* (2006.01)
(52) U.S. Cl.
USPC ............................ 370/401; 370/235; 715/700

(58) Field of Classification Search
USPC .................................. 370/401, 235; 715/700
See application file for complete search history.

(56) References Cited

U.S. PATENT DOCUMENTS

| 8,179,809 B1* | 5/2012 | Eppstein et al. ............... 370/252 |
| 2008/0151754 A1* | 6/2008 | Sarin et al. .................... 370/235 |
| 2009/0089671 A1* | 4/2009 | Bliss et al. ..................... 715/700 |
| 2010/0195620 A1* | 8/2010 | Cheng et al. ................... 370/331 |

\* cited by examiner

*Primary Examiner* — Wei Zhao
(74) *Attorney, Agent, or Firm* — Bacon & Thomas, PLLC

(57) ABSTRACT

The present invention is to provide a gateway device which, when determining that a network device connected thereto is a web camera and receives a packet from the web camera, is able to automatically add a port of the gateway device connected with the network device to a VLAN designated by the gateway device and then add a specific group code to the packet to specify the VLAN, such that the gateway device can transmit the packet to the VLAN according to the specific group code. The gateway device is then able to automatically set transmission priority of the packet to a high priority, such that after the packet is transmitted out of the VLAN, the packet can be transmitted through a transmission channel with the high priority, so as to improve the convenience of using the web camera and assure the transmission priority of the packet in the VLAN.

4 Claims, 2 Drawing Sheets

GATEWAY DEVICE CAPABLE OF ENHANCING VIDEO PACKET TRANSMISSION QUALITY AND METHOD THEREOF

FIELD OF THE INVENTION

The present invention relates to a gateway device, more particularly to a gateway device capable of enhancing video packet transmission quality, which is able to automatically add a port of the gateway device connected with a web camera to a virtual local area network (VLAN) designated by the gateway device and then add a specific group code to a video packet received from the web camera to specify the VLAN, such that the gateway device can transmit the video packet to the VLAN according to the specific group code and automatically set transmission priority of the video packet into a high priority, so as to enable the gateway device to transmit the video packet within the VLAN, or out of the VLAN, in the high priority according to the specific group code.

BACKGROUND OF THE INVENTION

Since cameras have the functions of taking pictures and transmitting instant images, many users have applied the cameras as remote monitoring devices to production line managements as well as other areas, such as road condition monitoring and public security monitoring. In general, the cameras available in the present day include a variality of conventional analog cameras and recent popular web cameras. The conventional analog cameras have the features of high photographic quality and stable signal transmission, and thus the analog cameras were put in a very important position in the past. In general, the installation of the analog camera usually requires users to connect an end of a coaxial cable to the analog camera and another end of the coaxial cable to an input terminal of a screen or a recording device installed with a hard disk, and then connect the recording device to the screen, such that the recording device can record an image of a picture taken by the analog camera, and the screen can play the image transmitted from the analog camera at the same time. Therefore, related people can view the image played on the screen for the monitoring task.

However, as the network technology advances, the photographic level and the signal transmission quality of a web camera are improved continuously to catch up with the level of the analog camera and meets market requirements, and many users start using web camera as a main remote monitoring device to replace the analog camera. It is noteworthy to point out that the so-called web camera is not necessarily a web camera installed in a computer system, but it generally refers to an IP camera with a network connection function. In addition the optical components required for taking pictures, the web camera also includes a microprocessor, a memory and a network connection module (such as a network card or a network chip). Compared with the conventional analog camera, the web camera obtains electric power through a network cable, and thus users no longer need additional electric wires and related electric equipments for the installation of the web camera and can save the hardware cost effectively.

As to the installation of the web camera, users have to build a virtual local area network (VLAN) by a gateway device (such as a switch, a router and a modem), connect the web camera and the gateway device by a network cable, and add the web camera to the virtual local area network by a manual setting, so that the gateway device can communicate with the web camera. After the web camera takes a picture to obtain a video signal and converts the video signal into a video packet, the video packet can be transmitted to the gateway device through the virtual local area network. However, the virtual local area network built by the gateway device generally contains other devices, such as a personal computer, and an Internet TV, etc. Since the packets sent by various different devices and the video packets produced by the web camera will be mixed in the virtual local area network and cannot be identified or divided into different transmission rates, and the gateway device is unable to automatically improve the transmission rate of the video packets, the problems of packet loss, transmission delay and low video quality inevitably occur while transmitting the video packets through the gateway device.

Although users can connect a web camera to a gateway device and add a port of the gateway device connected with the web camera to a virtural local area network (VLAN) designated by the gateway device when the gateway device is configuring ports of the VLAN, and adjust priority setting of the ports of the VLAN, such that the video packet produced by the web camera and received by the gateway device through the port can be transmitted with the first priority. However, the aforementioned setting procedure involves professional network knowledge which is too complicated for ordinary users. If a user wants to change the installation position of the web camera, the user has to reconfigure the aforementioned setting. Obviously, such application not only wastes a user's precious time, but also lowers the installation efficiency significantly.

It is an important subject for the present invention to overcome the shortcomings of the installation of a conventional web camera, improve the video packet transmission quality, and solve the packet loss and transmission delay problems.

SUMMARY OF THE INVENTION

In view of the aforementioned shortcomings of the prior art, the inventor of the present invention based on years of experience in the related industry to conduct extensive researches and experiments, and finally developed a gateway device capable of enhancing video packet transmission quality and a method thereof in accordance with the present invention, such that users can install a web camera without going through a complicated setup procedure, and the gateway device can transmit video packets received from the web camera with first priority. In the process of transmitting the video packets through the gateway device or method of the present invention, the packet loss and transmission delay problems will not occur, and the present invention can also improve the video playing quality effectively.

An objective of the present invention is to provide a gateway device capable of enhancing video packet transmission quality, wherein the gateway device comprises a control module, a storage module and at least one port. The storage module comprises a lookup table, and the lookup table comprises at least one set of corresponding device identification code (such as a MAC address or an OUI) and a device type (such as a wireless network card or a web camera). The control module is coupled to the storage module and the port respectively, and is also coupled to a network device through the port. The control module is able to retrieve a device identification code of the network device through the port and automatically compare the device identification code of the network device with the device identification code in the lookup table to determine the device type of the network device. When the control module determines that the network device is a web camera and receives a video packet from the web camera through the port, the control module automatically adds the port to a virtual local area network (VLAN) designated by the gateway device and then adds a specific group code to the video packet to specify the VLAN, such that the gateway device can transmit the video packet to the VLAN according to the specific group code.

Further, the control module automatically sets transmission priority of the video packet to a high priority, such that after the video packet is transmitted out of the virtual local area network, the video packet can still be transmitted through a transmission channel with the high priority. According to the present invention, users simply require connecting the web camera to the gateway device, so that the gateway device can add the specific group code to the video packet of the web camera automatically without going through the complicated setup procedure, Thus, the present invention can save the user's time significantly, and users can complete the installation of the web camera without requiring advanced network knowledge. In addition, the invention further improves the user's convenience of using the web camera and assures the transmission quality of the video packet in the virtual local area network. Besides, since the transmission priority of the video packet is set to the high priority, the video packet can be transmitted with first priority, even if the video packet is transmitted to a network environment of a complicated packet type. The invention not only overcomes the packet loss and transmission delay problems effectively, but also enables the video packet to be interpreted as an image smoothly.

Another objective of the present invention is to provide a method of enhancing a video packet transmission quality, which is applied to a gateway device. The gateway device comprises a lookup table, and the lookup table comprises at least one set of corresponding device identification code and device type. The gateway device is provided for retrieving a device identification code of a network device, and determining whether or not the network device is a web camera according to the lookup table. When the gateway device determines that the network device is a web camera and receives a video packet transmitted from the web camera, the gateway device automatically adds a port of the gateway device connected with the network device to a virtual local area network (VLAN) designated by the gateway device and then adds a specific group code to the video packet to specify the VLAN, so that the gateway device is able to transmit the video packet to the VLAN according to the specific group code. In addition, the gateway device can automatically set transmission priority of the video packet to a high priority to facilitate the gateway device to transmit the video packet out of the virtual local area network with a first priority to assure the transmission quality.

DETAILED DESCRIPTION OF THE PREFERRED EMBODIMENTS

Figures 1, 2:
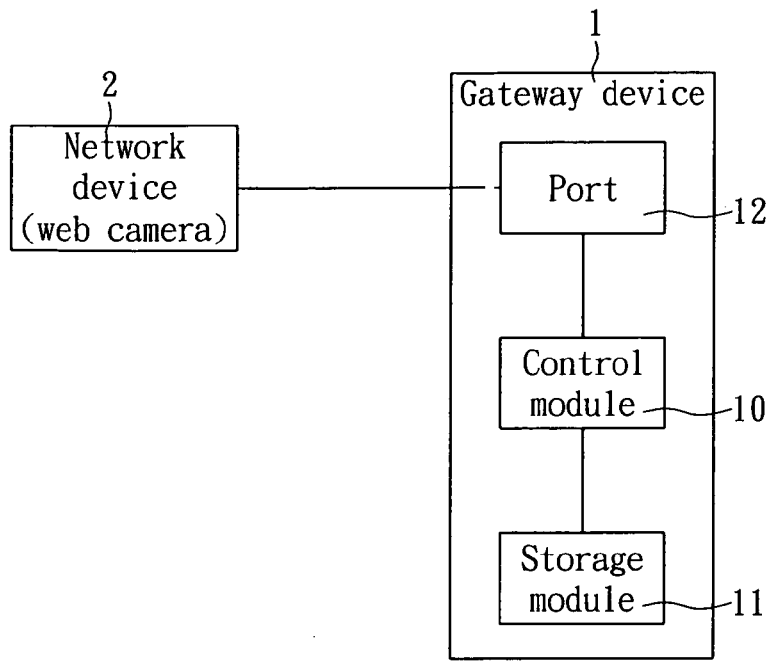
FIG. 1 is a schematic block diagram of a preferred embodiment of the present invention.
FIG. 2 is a lookup table of the present invention.

During the research and development of network devices and systems in the related industry, the inventor of the present invention found that most users have difficulties or insufficient advanced network knowledge to correctly install the present web cameras to a virtual local area network or a gateway device. On the other hand, since the conventional gateway device cannot automatically add a group code for specifying a video packet, and thus resulting in a poor video transmission quality. According to present existing technologies, although users can make adjustments manually, yet the setup procedure is too complicated, and it is almost impossible for ordinary users to install the web camera to the virtual local area network or the gateway device. Most related manufacturers try to improve the gateway device and the web camera to overcome the aforementioned problems, but up to now there is no feasible solution. In view of this situation, the inventor of the present invention developed a gateway device capable of automatically adding a specific group code to the video packet and enhancing transmission priority of the video packet, so as to improve the quality of the video packet transmission.

The present invention is to provide a gateway device capable of enhancing video packet transmission quality and a method thereof. As referring to FIG. 1, in accordance with a first preferred embodiment of the present invention, the gateway device 1 is a switch, but the present invention is not limited to such device only, and it also can be a router or a modem. The gateway device 1 comprises a control module 10, a storage module 11 and a port 12. However, the present invention is not limited to such arrangement only, and the quantity of ports 12 is not limited to one only. Manufacturers can increase the number of ports 12 according to the design and manufacturing requirements of the gateway device 1, so that the gateway device 1 can be connected to a plurality of network devices.

With reference to FIGS. 1 and 2, the storage module 11 comprises a lookup table 20, and the lookup table 20 comprises a plurality of sets of corresponding device identification code and device type. In FIG. 2, the device identification code includes first six characters of the OUI value, and the OUI value is a hardware identification code. According to the lookup table 20 as shown in FIG. 2, if the first six characters of the OUI value of a network device are "F2-50-24", it indicates that the network device is a wireless network card. If the first six characters of the OUI value of a network device are "F0-68-13", it indicates that the network device is a web camera. It is noteworthy to point out that the present invention can also be designed by using the starting characters (such as the first six characters) of a MAC address as the device identification code to build the lookup table 20, and numerous modifications and variations could be made by those skilled in the art without departing from the scope and spirit of the invention set forth in the claims.

Figure 3:
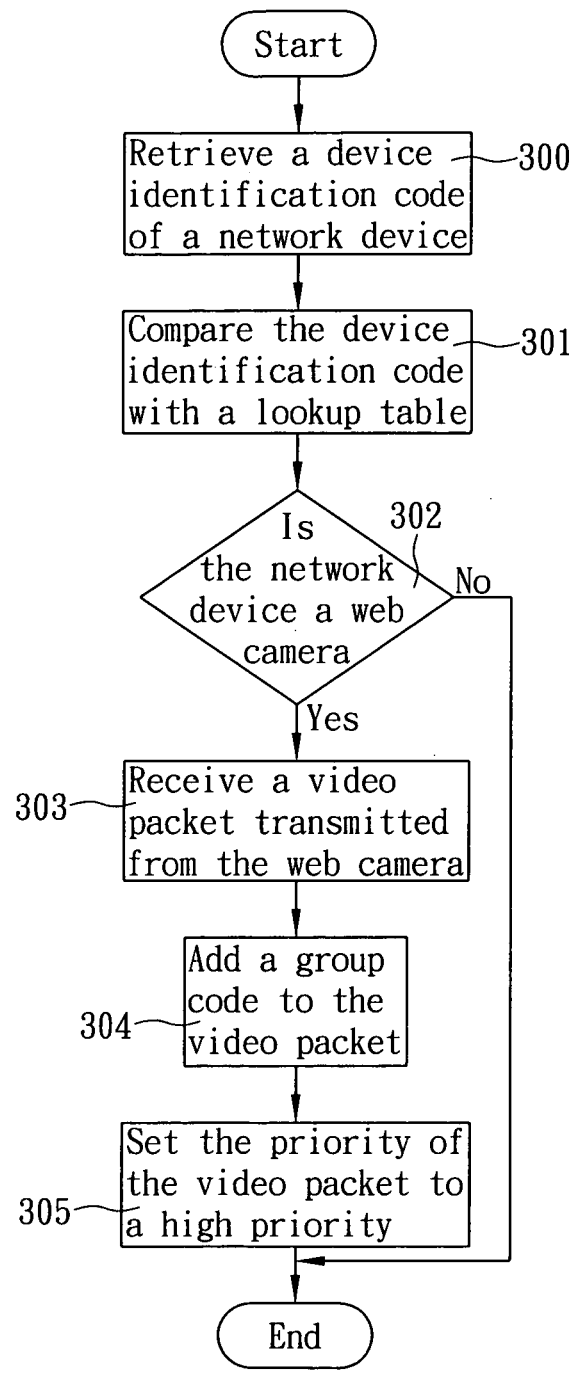
FIG. 3 is a flow chart of a preferred embodiment of the present invention.

In FIG. 1, the control module 10 is coupled to the storage module 11 and the port 12 respectively, and the control module 10 is coupled to a network device 2 through the port 12. In this preferred embodiment, the network device 2 is coupled to the port 12 by a RJ-45 network cable. With reference to FIGS. 1 and 3, the control module 10 determines a device type of the network device 2 by the following procedure to increase the transmission rate and the transmission priority of the video packet, and the procedure comprises the steps of:

(300) retrieving a device identification code of the network device 2 by the control module 10 through the port 12;

(301) automatically comparing the device identification code of the network device 2 with the device identification code in the lookup table 20 by the control module 10;

(302) determining whether or not the network device 2 is a web camera by the control module 10; if yes, then go to Step (303), or else terminate the procedure;

(303) receiving a video packet transmitted from the network device 2 (web camera) through the port 12 by the control module 10;

(304) automatically adding the port 12 to a virtual local area network (VLAN) designated by the gateway device and then adding a specific group code to the video packet to specify the VLAN, such that the gateway device 1 can transmit the video packet to the virtual local area network according to the specific group code, wherein the specific group code may be a universal group code "4094", which is used to specify that the video packet being received from the network device 2 should be transmitted through the VLAN; and (305) automatically setting transmission priority of the video packet to a high priority by the control module 10, such that after the video packet is transmitted out of the virtual local area network, the video packet can also be transmitted through a transmission channel with the high priority.

In Step (302), if the device identification code (which is the first six characters of OUI value) of the network device 2 is "F0-68-13", and the control module 10 can determine that the network device 2 is a web camera according to the device identification code stored in the lookup table 20. In Steps (303) and (304), after the video packet produced by the network device 2 (web camera) is received, a specific group code "4094" is automatically added to all the packets received from the network device 2, so that the gateway device 1 can distinguish the packets received from the network device 2 from packets of other types by the specific group code to avoid the packets received from the network device 2 from mixing with the packets of the other types. Therefore, the video packet can be transmitted successfully in the virtual local area network to reduce the packet loss and transmission delay effectively. In Step (305), the control module 10 automatically sets the priority parameter in an IEEE 802.1p tag of the video packet to 5 which indicates that the video packet has a high priority, such that after the video packet leaves the virtual local area network and enters into another network environment, other network devices and gateway devices can allocate the video packet to a high-priority transmission path to transmit the video packet according to the priority parameter in the video packet.

In summation of the description above, users no longer require any advanced network knowledge, and is able to simply connect the network device 2 (web camera) to the gateway device 1 for an easy application. The gateway device 1 with the technical characteristics of the present invention will automatically add a port of the gateway device 1 connected with the network device 2 to a virtual local area network (VLAN) designated by the gateway device 1 when determining that the network device 2 is a web camera and then add a specific group code to the packet to specify the VLAN, such that the network device 2 (i.e. the web camera) can be added into a virtual local area network specified by the gateway device 1 to waive the complicated setup procedure and save the user's time significantly. In addition, the gateway device 1 can transmit the video packet in the virtual local area network according to the specific group code to assure the transmission quality of the video packets in the virtual local area network. In addition, since the gateway device 1 can automatically set the transmission priority of the video packet to a high priority, the video packet can be transmitted with a high priority in the network environment, even though the process of transmitting video packets out of the virtual local area network is more complicated (since the packet type is complicated). As a result, the video packet can be interpreted as an image smoothly to effectively overcome the packet loss and transmission delay problems and enhance the image quality, and the web camera can be used in an environment that requires a high photographic quality. The present invention not only improves the practicability of the web camera, but also broadens the scope of applicability of the web camera.

While the invention has been described by means of specific embodiments, numerous modifications and variations could be made thereto by those skilled in the art without departing from the scope of the invention set forth in the claims.

What is claimed is:

1. A gateway device configured to enhance video packet transmission quality, comprising:
   a storage, for storing a lookup table, wherein the lookup table comprises at least one set of corresponding device identification code and device type;
   at least one port, for connecting a network device; and
   a controller, coupled to the storage and the port respectively, and configured to receive a device identification code of the network device through the port and automatically comparing the device identification code of the network device with the device identification code in the lookup table;
   thereby, when the controller determines that the network device is a web camera and receives a video packet transmitted from the web camera through the port, the controller automatically adds a specific group code to the video packet for assigning a virtual local area network to the video packet, so that the web camera is added into the virtual local area network designated by the gateway device, and the gateway device transmits the video packet to the virtual local area network according to the specific group code, and
   wherein the specific group code is a universal group code for specifying that the video packet received from the web camera should be transmitted to the virtual local area network by the gateway device, and wherein the controller automatically sets the priority of the video packet to a high priority, such that after the video packet is transmitted out of the virtual local area network, the video packet is transmitted through a transmission channel with the high priority.

2. The gateway device of claim 1, wherein the controller automatically sets a priority parameter in an IEEE 802.1p tag of the video packet to 5.

3. A method of enhancing a video packet transmission quality, applied to a gateway device having a lookup table, wherein the lookup table comprises at least one set of corresponding device identification code and device type, and the method comprising the steps of:
   retrieving a device identification code of a network device;
   determining whether or not the network device is a web camera according to the lookup table;
   receiving a video packet transmitted from the web camera when the network device is determined as the web camera; and
   automatically adding a port of the gateway device connected with the web camera to a virtual local area network designated by the gateway device and then adding a specific group code to the video packet for specifying the virtual local area network, wherein the specific group code is a universal group code for specifying that the video packet received from the port should be transmitted to the virtual local area network by the gateway device;
   thereby, the gateway device transmits the video packet to the virtual local area network according to the specific group code; and automatically setting the priority of the video packet to a high priority, such that after the video packet is transmitted out of the virtual local area network, the video packet can be transmitted through a transmission channel with the high priority.

4. The method of claim 3, further comprising the step of automatically setting a priority parameter in an IEEE 802.1p tag of the video packet to 5 so as to set transmission priority of the video packet to the high priority.

* * * * *